United States Patent Office 3,069,447
Patented Dec. 18, 1962

3,069,447
ORGANO-TIN COMPOUNDS AND THEIR
PREPARATION
Gerry P. Mack, Jackson Heights, N.Y., assignor to Metal
& Thermit Corporation, Woodbridge Township, N.J.,
a corporation of New Jersey
No Drawing. Filed Apr. 1, 1960, Ser. No. 19,163
15 Claims. (Cl. 260—429.7)

The present invention is directed to novel organotin compounds, and to chlorine-containing resins stabilized therewith.

It is an object of this invention to provide novel organotin sulfur compounds.

It is also an object of this invention to provide a process for preparing novel organotin compounds.

Still another object of this invention is to provide stabilized chloride-containing resins containing novel organotin sulfur compounds.

I discovered that organotin sulfur compounds which are prepared by reacting a diorganotin oxide with pentaerythritol tetramercaptoacetate or pentaerythritol tetra-$\beta$-mercaptopropionate are excellent stabilizers for the prevention of heat degradation in halogen-containing resins, particularly polyvinyl chloride homopolymers and copolymers. The organotin sulfur compounds contemplated have the general formula $[R_2Sn]_2[C(CH_2OCOR'S)_4]$. They are the reaction product of diorganotins having the general formula $R_2SnO$ with a pentaerythritol tetra ester of (i) mercaptoacetic acid (thioglycolic acid) or (ii) $\beta$-mercaptopropionic acid. The molar ratio of the organotin to the ester is 2:1. The diorganotin oxide reactants have the general formula $R_2SnO$; R is a phenyl group or an alkyl group having up to 12 carbon atoms. The pentaerythritol ester reactants have the general formula $C(CH_2OCOR'SH)_4$; R' is a methylene or ethylene group.

The reaction between the diorganotin and the ester is generally carried out in the presence of an inert vehicle. Suitable reaction temperatures are slightly above room temperature up to the reflux temperature of the reaction mixture. The reaction mixture is usually refluxed after completion of the addition of the reactants. It is then cooled and the reaction product separated from the vehicle. The reaction is preferably carried out in an inert atmosphere such as nitrogen. Suitable vehicles for the reaction are inert to the reactants and the reaction products, and include toluene, xylene, benzene, cyclohexane, acetone, water, chloroform, etc. The reaction product is also formed by the equivalent direction reaction of the diorganotin oxide and the pentaerythritol ester under fusion conditions in the absence of any vehicle.

Compounds illustrative of the reaction products prepared by the above noted process are the reaction products of pentaerythritol tetramercaptoacetate or pentaerythritol-tetra-$\beta$-mercaptopropionate with such dialkyltins as dimethyltin oxide, dibenzyltin oxide, dibutyltin oxide, dioctylin oxide, dilauryltin oxide and diphenyltin oxide.

The preparation of the reaction product with the organotin compound and the pentaerythritol ester has been disclosed in terms of the preferred process, i.e., the reaction product of the diorganotin oxide with the pentaerythritol ester (Equation No. 1).

(1)
$2R_2SnO + C(CH_2OCOR'SH)_4 \rightarrow$
$[R_2Sn]_2[C(CH_2OCOR'S)_4] + H_2O$ The reaction product is believed formed by the splitting out of water and the formation of tin to sulfur bonds. Theoretically, each tin atom is bonded to two sulfur atoms when two moles of the oxide are reacted with one mole of the ester. However, evidence derived from the analysis of the reaction product indicates that all four of the tin-sulfur bonds theoretically possible may not be formed. I am not able to definitely set forth the structure of the reaction product; in fact, the reaction may not always go to theoretical completion. The reaction product is a white to off-white solid of generally crystalline nature with faint "glassy" surface appearance. It appears to be a macromolecule. Molecular weight measurements, by the isopiestic method in chloroform at room temperature, indicate average molecular weights within the range between those characteristics of a monomer and a dimer. Equivalent processes may be practiced utilizing as a reactant in place of the diorganotin oxide, the equivalent diorganotin chlorides or bromides. They are reacted with the ester in the presence of a hydrogen halide acceptor, such as ammonia. A salt of the pentaerythritol ester, such as the sodium salt (sodium replacing the mercapto hydrogen) may be used in place of the ester itself. Illustrative examples of equivalent processes are set forth in Equations No. 2 to No. 4.

(2)
$2R_2Sn(OH_2 + C(CH_2OCOR'SH)_4 \rightarrow$
$[R_2Sn]_2[C(CH_2OCOR'S)_4] + 4NH_4Cl$ (3)
$2R_2SnCl_2 + C(CH_2OCOR'SH)_4 \xrightarrow{2NH_3}$
$[R_2Sn]_2[C(CH_2OCOR'S)_4] + 4NH_4Cl$ (4)
$2R_2SnCl_2 + C(CH_2OCOR'SNa)_4 \rightarrow$
$[R_2Sn]_2[C(CH_2OCOR'S)_4] + 4NaCl$ As is obvious from the aforesaid, the use of the noted equivalents for the oxide are merely variants of the same process. For simplicity herein, the reaction process is described in terms of the reaction between the diorganotin oxide and the pentaerythritol ester. Similarly, the product formed from this reaction is described as the reaction product thereof. However, the use of equivalent raw materials in the equivalents of this process are encompassed in this terminology.

For the purpose of giving those skilled in the art a better understanding of the invention, the following illustrative examples are given.

EXAMPLE 1

*The Reaction Product of Dibutyltin Oxide and Pentaerythritol Tetramercaptoacetate*

4.8 moles of dibutyltin oxide are added in small portions to a flask containing 2.4 moles of pentaerythritol tetramercaptoacetate in 8000 ml. of toluene at about 55° C. During the addition the temperature rose to 90° C. After completion of the addition the reaction mixture is heated to reflux and the water separated. The reaction product precipitates during the reaction. The reaction mixture is cooled, the solids separated, and the solid product having the formula:

$[(C_4H_9)_2Sn]_2[C(CH_2OCOCH_2S)_4]$ recovered. The sulfur and tin analyses follow:

Percent Sn—Theoretical 26.5; found 25.23
Percent S—Theoretical 14.4; found 14.62

The reaction products of the dibutyltin oxide and the pentaerythritol tetramercaptoacetate were prepared in high yields from similar reactions utilizing such other inert vehicles as a mixture of toluene and acetone, water, chloroform, etc. All the products were white to off-white crystalline material which does not have appreciable solubility in most commonly available solvents. It is soluble in chloroform. The reaction in chloroform is a true solution type reaction, whereas the reaction in the other vehicles is of the interfacial type.

EXAMPLE 2

Following the procedure of Example 1, 2 parts (all parts referred to in these examples are on a molar basis) of dimethyltin oxide is reacted with 1 part of pentaerythritol tetramercaptoacetate to yield a reaction product having the formula: $[(CH_3)_2Sn]_2[C(CH_2OCOCH_2S)_4]$.

EXAMPLE 3

Following the general procedure of Example 1, 2 parts of diphenyltin dichloride are reacted with 1 part of pentaerythritol tetra-β-mercaptopropionate in chloroform, with the addition of ammonia, to yield a reaction product having the formula: $[(C_6H_5)_2Sn]_2[C(CH_2OCOC_2H_4S)_4]$.

EXAMPLE 4

Following the procedure of Example 1, 2 parts of dioctyltin oxide are reacted with 1 part of pentaerythritol tetramercaptoacetate to yield a reaction product having the formula: $[(C_8H_{17})_2Sn]_2[C(CH_2OCOCH_2S)_4]$.

EXAMPLE 5

Following the general procedure of Example 1, 2 parts of dilauryltin dibromide are reacted with 1 part of the sodium salt of pentaerythritol tetra-β-mercaptopropionate in chloroform, resulting in the splitting off of sodium chloride and the formation of a reaction product having the formula: $[(C_{12}H_{25})_2Sn]_2[C(CH_2OCOC_2H_4S)_4]$.

EXAMPLE 6

Following the procedure of Example 1, 2 parts of diphenyltin oxide are reacted with 1 part of pentaerythritol tetramercaptoacetate to yield a reaction product having the formula: $[(C_6H_5)_2Sn]_2[C(CH_2OCOCH_2S)_4]$.

EXAMPLE 7

Following the procedure of Example 1, 2 parts of dibenzyltin oxide are reacted with 1 part of pentaerythritol tetra-β-mercaptopropionate to yield a reaction product having the formula:

$[(C_6H_5CH_2)_2Sn]_2[C(CH_2OCOC_2H_4S)_4]$

EXAMPLE 8

Following the procedure of Example 1, 2 parts of dibutyltin oxide are reacted with 1 part of pentaerythritol tetra-β-mercaptopropionate to yield a reaction product having the formula:

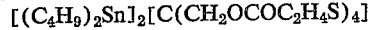
$[(C_4H_9)_2Sn]_2[C(CH_2OCOC_2H_4S)_4]$

EXAMPLE 9

Two parts of dibutyltin oxide are reacted with one part of pentaerythritol tetramercaptoacetate by blending and heating in a steam jacketed mechanical blender to yield the reaction product having the formula:

$[(C_4H_9)_2Sn]_2[C(CH_2OCOCH_2S)_4]$

The diorganotin-sulfur containing reaction products, $[R_2Sn]_2[C(CH_2OCOR'S)_4]$, of this invention have been found to be superior stabilizers for halogen-containing resins, particularly polyvinyl chloride homopolymers and copolymers. Oxide-ester reaction products prepared using molar proportions that deviate somewhat from the preferred 2:1 ratio are equivalent materials when utilized as stabilizers. Related oxide-ester reaction products are prepared by reacting stoichiometric proportions of the diorganotin oxide with the di- and tri-pentaerythritol esters. These esters are suitably prepared from commercial mixtures of the polypentaerythritols.

Those resins to which this application is most particularly directed are those formed of polymers containing vinyl chloride units in their structures, such as copolymers of vinyl chloride with vinyl alcohols and with vinyl esters of aliphatic carboxylic acids, particularly vinyl acetate, copolymers of vinyl chloride with esters, nitriles and amides of unsaturated carboxylic acids, e.g., of acrylic and methacrylic acid, copolymers of vinyl chloride with diene compounds and with unsaturated dicarboxylic acids or their anhydrides, etc. They have been found particularly effective in the stabilization of "rigid" vinyl resins which are particularly susceptible to degradation during the unusually high temperatures required during their processing. They are also useful in the stabilization of plasticized resins as well as such materials as organosols and plastisols.

An example of the unusual effectiveness of these reaction products as stabilizers was the comparison of the product of Example 1 with one of the best of the commercial stabilizers. In an oven test at 375° C., it was found that the same weight of the new stabilizer prevented failure of the resin by heat degradation for as long as 105 to 120 minutes, whereas the commercial stabilizer failed after 75 minutes. Other comparative tests between the commercial stabilizer and the reaction product of Example 1 have shown that equivalent stabilization is achieved with the new stabilizer using only ½ to ⅔ the weight required of the commercial product. Dependent on the degree of stabilization required, these new diorganotin-pentaerythritol ester reaction products are effective when incorporated in resins in amounts as low as about ½ to 1 part per 100 parts of resin (by weight). For rigid formulations, they are preferably used in amounts of about 1½ to 2½ parts per 100 parts of resin. In plasticized resins, excellent stabilization is obtained at about 1 part per 100 parts of resin. In view of the cost of these stabilizers, it is to be expected that not more than about 3 or 4 parts per 100 parts of resin will be used.

As many embodiments of this invention may be made without departing from the spirit and scope thereof, it is to be understood that the invention includes all such modifications and variations as come within the scope of the appended claims.

I claim:

1. The reaction product prepared by reacting an oxide having the formula $R_2SnO$, wherein R is a group selected from the class consisting of phenyl groups and alkyl groups having up to 12 carbon atoms, with an ester selected from the class consisting of pentaerythritol tetramercaptoacetate and pentaerythritol-tetra-β-mercaptopropionate, in a molar ratio of about 2 parts of the oxide to 1 part of the ester.

2. The reaction product of claim 1 wherein the oxide is dibutyltin oxide and the ester is pentaerythritol tetramercaptoacetate.

3. The reaction product of claim 1 wherein the oxide is dioctyltin oxide and the ester is pentaerythritol tetramercaptoacetate.

4. The reaction product of claim 1 wherein the oxide is dimethyltin oxide and the ester is pentaerythritoltetramercaptoacetate.

5. The reaction product of claim 1 wherein the oxide is diphenyltin oxide and the ester is pentaerythritol tetramercaptoacetate.

6. The reaction product of claim 1 wherein the oxide is dibutyltin oxide and the ester is pentaerythritol-β-mercaptopropionate.

7. A process comprising reacting an oxide having the formula $R_2SnO$, wherein R is a group selected from the class consisting of phenyl groups and alkyl groups having up to 12 carbon atoms, with an ester selected from the class consisting of pentaerythritol tetramercaptoacetate and pentaterythritol-tetra-β-mercaptopropionate, in a molar ratio of about 2 parts of the oxide to 1 part of the ester.

8. The process of claim 7 carried out in an inert vehicle and under an inert atmosphere.

9. The process of claim 8 wherein the oxide is dibutyltin oxide and the ester is pentaerythritol tetramercaptoacetate.

10. The process of claim 8 wherein the oxide is dioctyltin oxide and the ester is pentaerythritol tetramercaptoacetate.

11. The process of claim 8 wherein the oxide is dimethyltin oxide and the ester is pentaerythritol tetramercaptoacetate.

12. The process of claim 8 wherein the oxide is diphenyltin oxide and the ester is pentaerythritol tetramercaptoacetate.

13. The process of claim 8 wherein the oxide is dibutyltin oxide and the ester is pentaerythritol-tetra-β-mercaptopropionate.

14. A process comprising reacting an oxide having the formula $R_2SnO$, wherein R is a group selected from the class consisting of phenyl groups and alkyl groups having up to 12 carbon atoms, with an ester selected from the class consisting of pentaerythritol tetramercaptoacetate and pentaterythritol tetra-β-mercaptopropionate, in a molar ratio of about 2 parts of the oxide to 1 part of the ester, said reaction being carried out in the presence of an inert vehicle selected from the group consisting of toluene, xylene, benzene, cyclohexane, acetone, water and chloroform.

15. A process comprising reacting an oxide having the formula $R_2SnO$, wherein R is a group selected from the class consisting of phenyl groups and alkyl groups having up to 12 carbon atoms, with an ester selected from the class consisting of pentaterythritol tetramercaptoacetate and pentaerythritol tetra-β-mercaptopropionate, in a molar ratio of about 2 parts of the oxide to 1 part of the ester, said reaction being carried out under fusion conditions.

References Cited in the file of this patent

UNITED STATES PATENTS

| | | |
|---|---|---|
| 2,752,325 | Leistner et al. | June 26, 1956 |
| 2,855,417 | Weinberg | Oct. 7, 1958 |
| 2,870,119 | Leistner et al. | Jan. 20, 1959 |
| 2,870,182 | Leistner et al. | Jan. 20, 1959 |
| 2,872,648 | Leistner et al. | Feb. 3, 1959 |